F. F. McGUIRE.
PORTABLE WARDROBE.
APPLICATION FILED MAR. 30, 1911.
1,075,298.
Patented Oct. 7, 1913.
3 SHEETS—SHEET 1.
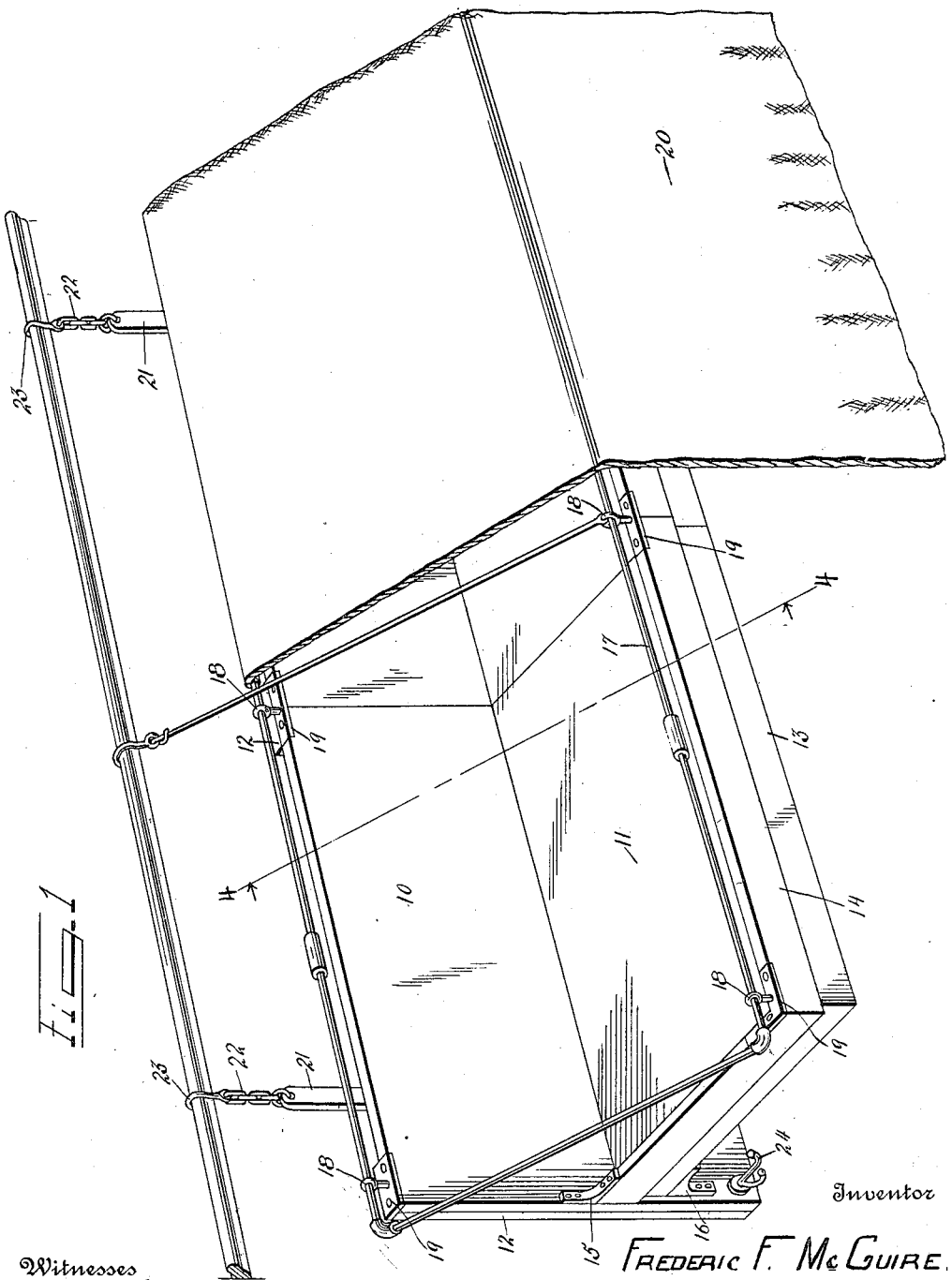

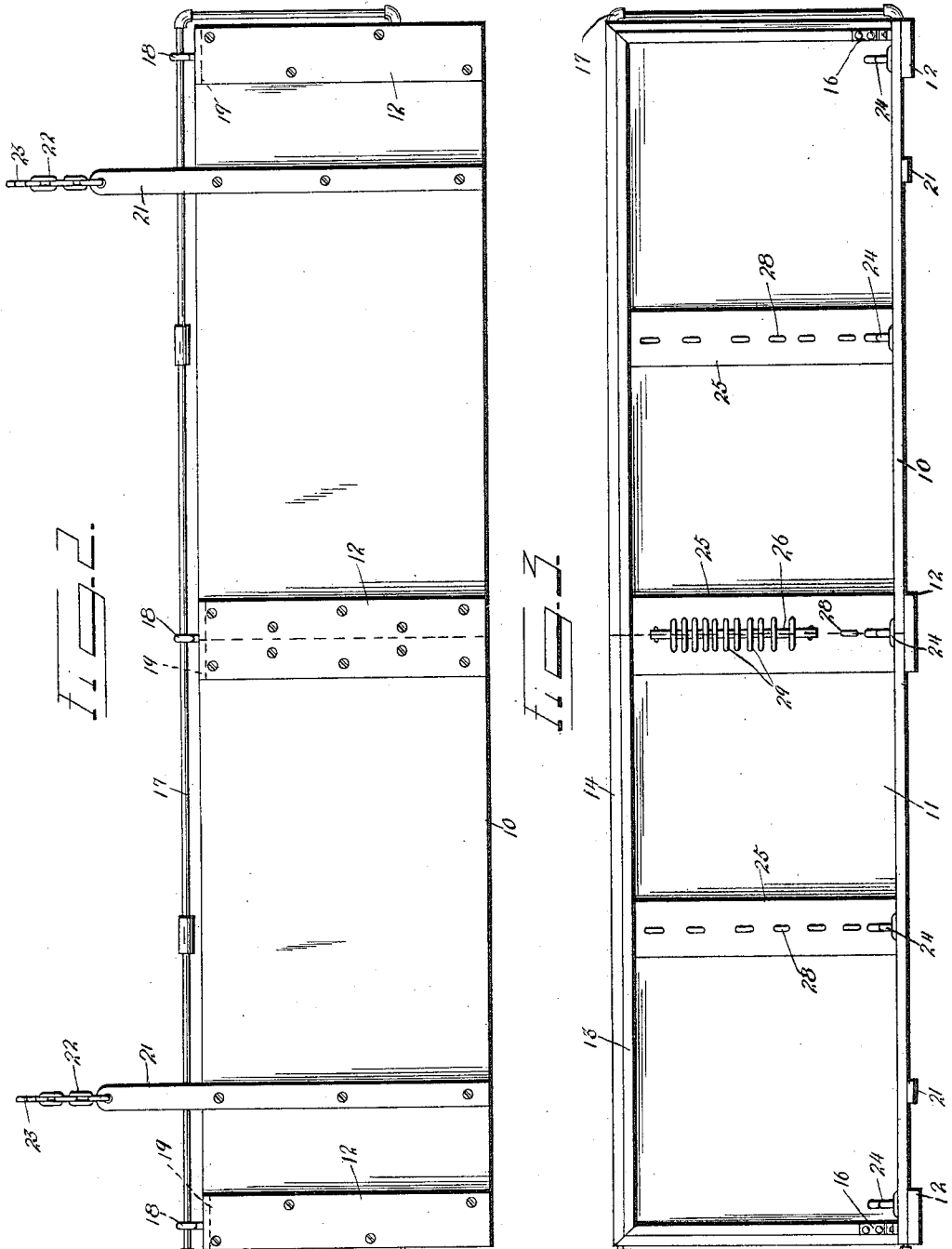

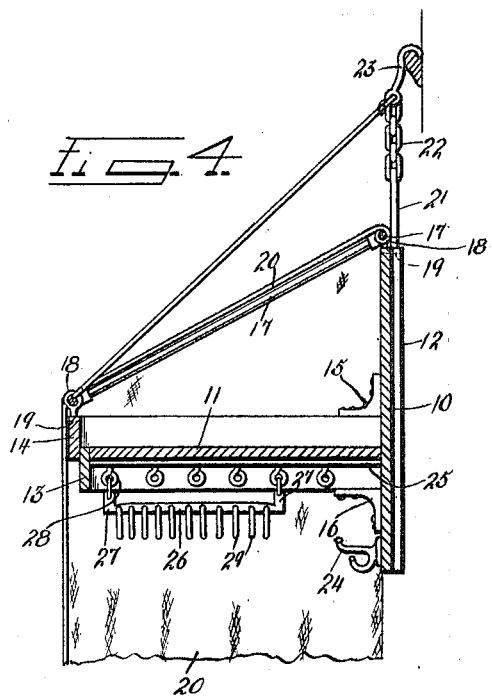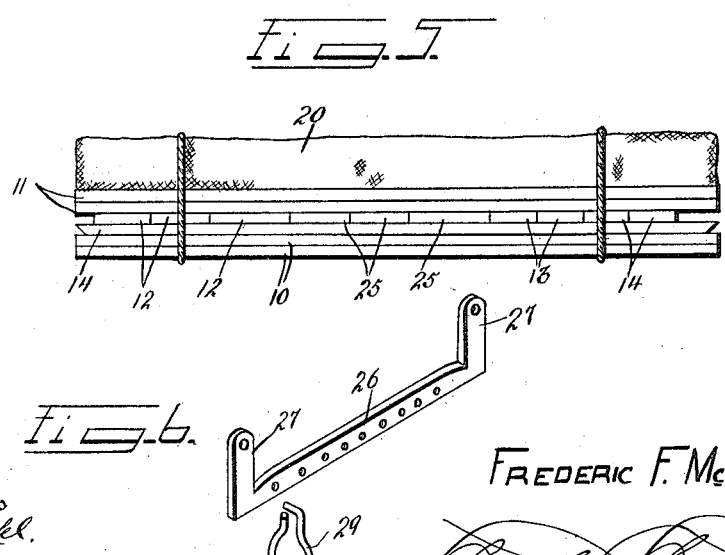

UNITED STATES PATENT OFFICE.

FREDERIC F. McGUIRE, OF SAGINAW, MICHIGAN.

PORTABLE WARDROBE.

1,075,298.   Specification of Letters Patent.   Patented Oct. 7, 1913.

Application filed March 30, 1911.   Serial No. 618,020.

*To all whom it may concern:*

Be it known that I, FREDERIC F. McGUIRE, a citizen of the United States, residing at Saginaw, in the county of Saginaw, State of Michigan, have invented certain new and useful Improvements in Portable Wardrobes; and I do hereby declare the following to be a full, clear, and exact description of the invention, such as will enable others skilled in the art to which it appertain to make and use the same.

This invention relates to knock-down wardrobes and has for an object to provide a strong and light wardrobe in the nature of a shelf that may be quickly assembled and disassembled and further will be securely braced against collapsing under load.

A further object of the invention is to provide a wardrobe that will be ventilated without the ventilating means being conspicuous.

A still further object of the invention is to provide a wardrobe composed of a few simple and inexpensive parts that when in knocked-down position will occupy a minimum amount of space for storing.

A still further object of the invention is to provide a wardrobe in the nature of a shelf in which the bottom board of the shelf will be reinforced against warping and splitting under various conditions of load and climate.

With the above objects in view the invention consists in certain novel details of construction and combination of parts hereinafter fully described and claimed, it being understood that various modifications may be made in the minor details of construction within the scope of the appended claim.

In the accompanying drawing forming part of this specification:—Figure 1 is a perspective view of a wardrobe constructed in accordance with my invention with parts of the curtain removed to expose the interior of the wardrobe. Fig. 2 is a rear elevation of the wardrobe. Fig. 3 is a bottom plan view of the wardrobe. Fig. 4 is a cross sectional view taken on the line 4—4 Fig. 1. Fig. 5 is a view in elevation showing the wardrobe in knocked-down form. Fig. 6 is a detail perspective view of the necktie holder.

Referring now to the drawing in which like characters of reference designate similar parts, the wardrobe is seen to comprise a shelf having a back board 10 formed of two similar boards placed end to end, and a bottom board 11 formed of two similar boards placed end to end, the bottom board being secured as will hereinafter appear to the back board and being spaced inwardly from the opposite longitudinal edges of the back board as clearly shown in Fig. 1.

Arranged at the opposite ends of the back board, and also at the confronting ends of the two similar boards forming the back board are cleats 12, the cleats being secured by bolts, screws or other suitable connectors to the back board. The end cleats of the series reinforce the back board against warping and splitting, while the intermediate cleat of the series rigidly holds the two mating boards of the back board together.

A strip of molding 13 is run around the marginal edges of the bottom board, this molding projecting below the bottom face of the bottom board. A similar strip of molding 14 is run around the molding 13 and projects above the top face of the bottom board 11, any suitable connectors such as screws, wooden pegs, or the like being engaged through both strips of molding and into the marginal edge of the bottom board for detachably securing the parts together. Angle iron brackets 15 and 16 are secured to the upper edge of the molding 14 and to the back board, and to the lower edge of the molding 13 and to the back board respectively, these angle iron brackets removably securing the bottom and back boards together. Thus by the removal of four angle iron brackets, the back and bottom boards of the shelf may be disassembled.

A rectangular skeleton frame 17 is secured to the top edges of the back board 10 and molding 14, this frame being formed of sections of tubing or the like these sections being of any convenient length and being connected together at their opposite ends by ordinary couplings of any preferred kind. The frame is slightly greater in length than the length of the shelf so that the ends of the frame project slightly beyond the end edges of the shelf. Further the frame is held spaced above the edges of the back board and molding through the instrumentality of pins 18 which encircle the longitudinal side members of the frame, and are equipped on their shanks with plate-like feet 19 which are secured to the upper edge of the molding 14 through the instrumentality of screws or the like. It will now be noted that the frame by being rigidly connected to the uppermost edge portions of the back board and molding, performs the function of an inclined brace which coöperates with the angle iron brackets in holding the bottom board against collapsing when under load. The frame further performs the function of a curtain support, an approximately rectangular open ended curtain envelop 20 being slipped downward upon the skeleton frame and enveloping the entire shelf as clearly shown in Fig. 1. It will be noted that by virtue of the skeleton frame being slightly longer than the shelf, those portions of the curtain at the end edges of the shelf will be spaced outwardly from the shelf so that air may pass upwardly from the lower side to the upper side of the shelf and promote ventilation of the wardrobe.

Arranged upon the back face of the back board is a pair of metal strips 21 which are equipped at their upper ends with flexible chains or the like 22, these chains terminating in hooks 23 designed to engage the molding of a room and suspend the shelf out such a distance from the floor that coats and the like may be secured below the shelf and within the curtain. Garment engaging hooks 24 are secured to the back board below the bottom board and form means for suspending coats and the like.

It will here be stated that the molding strips 13 and 14 reinforce the bottom board against cracking and warping under load and under various conditions of climate, and for further reinforcing the bottom board against distortion, a plurality of cleats 25 are arranged transversely across the bottom face of the bottom board, the intermediate cleat of the series performing an additional function of securing together the mating ends of the members forming the bottom board as clearly shown in Fig. 3.

For securing neckties and the like within the wardrobe, an elongated bar 26 is provided with orificed upturned ends 27 which are loosely connected to the bottom face of the bottom board through the instrumentality of hook and eye connections 28. A plurality of orifices are formed in the bar, and through these orifices are looped the bights of wire ring members 29 through which ties and the like may be separately engaged.

In knocking down the wardrobe for storing, the curtain is removed, and the cleats which secure the mating members of the back and bottom boards removed together with the angle iron brackets and also together with the separate lengths of molding which form the longitudinal and end members of the molding strips above described. The two members of the back board are now placed one upon the other, all of the cleats together with the end sections of the molding strips then being placed side by side upon the top face of the uppermost member of the back board. Now the members of the bottom board are placed one upon the other and then these juxtaposed members placed bodily upon the cleats and molding strips as clearly shown in Fig. 5. The curtain envelop may now be folded and placed upon the uppermost member of the bottom board, and a tie element such as cord or the like wrapped about the bundle thus formed in which position of the parts a compact bundle will be formed for storing.

What is claimed, is:—

In a wardrobe, the combination with a shelf and a backboard extending thereabove, of a rectangular frame having one side connected to the top edge of the backboard and being inclined downward therefrom and having its other side connected to the outer edge of the shelf and thereby supporting the shelf rigidly with relation to the backboard, the ends of the rectangular frame extending past the ends of the shelf, and a curtain secured to the top of the downwardly inclined frame so as to form a roof over the shelf and an envelop for the space under the shelf.

In testimony whereof, I affix my signature, in presence of two witnesses.

FREDERIC F. McGUIRE.

Witnesses:
JAMES G. McGUIRE,
MARY B. OTTO.

Copies of this patent may be obtained for five cents each, by addressing the "Commissioner of Patents, Washington, D. C."